(12) United States Patent
Rave et al.

(10) Patent No.: US 10,608,944 B2
(45) Date of Patent: Mar. 31, 2020

(54) DEVICE SELECTION FOR PROVIDING AN END-TO-END NETWORK CONNECTION

(71) Applicant: Teridion Technologies LTD, Petach Tiqwa OT (IL)

(72) Inventors: Elad Rave, Walnut Creek, CA (US); Yarden Horev, San Francisco, CA (US); Oleg Rabinovich, Netanya (IL)

(73) Assignee: Teridion Technologies LTD, Petach Tikva (IL)

( * ) Notice: Subject to any disclaimer, the term of this patent is extended or adjusted under 35 U.S.C. 154(b) by 0 days.

(21) Appl. No.: 15/964,479

(22) Filed: Apr. 27, 2018

(65) Prior Publication Data

US 2019/0334823 A1 Oct. 31, 2019

(51) Int. Cl.
*H04L 12/801* (2013.01)
*H04L 12/26* (2006.01)

(52) U.S. Cl.
CPC ............ *H04L 47/18* (2013.01); *H04L 43/062* (2013.01); *H04L 43/0811* (2013.01); *H04L 43/16* (2013.01)

(58) Field of Classification Search
CPC ..... H04L 47/18; H04L 43/16; H04L 43/0811; H04L 43/062; H04B 7/2121; H04B 7/2123; H04J 2203/0069; H04Q 2213/394; H04W 72/04; H04W 72/12
See application file for complete search history.

(56) References Cited

U.S. PATENT DOCUMENTS

| | | | |
|---|---|---|---|
| 6,097,727 | A | 8/2000 | Peters |
| 8,724,456 | B1 | 5/2014 | Hong et al. |
| 8,937,957 | B2 | 1/2015 | Mitra et al. |
| 9,363,161 | B2 | 6/2016 | Aissaoui et al. |
| 9,369,384 | B2 | 6/2016 | Hung |
| 2003/0046388 | A1* | 3/2003 | Milliken ............... H04L 41/046 709/224 |
| 2006/0195581 | A1 | 8/2006 | Vaman et al. |
| 2015/0172166 | A1 | 6/2015 | Aissaoui et al. |

* cited by examiner

*Primary Examiner* — Dady Chery
(74) *Attorney, Agent, or Firm* — Brian R. Short

(57) ABSTRACT

Systems, methods, and apparatuses for selecting a server for a user are disclosed. One method includes collecting performance parameters associated with a plurality of servers, wherein the plurality of servers facilitates end-to-end network connections through a network. The method further includes selecting a server to provide end-to-end network connection between the user and a target based on the collected performance parameters, wherein the selected server is included within the end-to-end network connection, and wherein the user and the target are endpoint edge devices. The method further includes connecting the user to the selected server, thereby providing the end-to-end network connection between the user and the target.

18 Claims, 8 Drawing Sheets

DEVICE SELECTION FOR PROVIDING AN END-TO-END NETWORK CONNECTION

FIELD OF THE DESCRIBED EMBODIMENTS

The described embodiments relate generally to network communications. More particularly, the described embodiments relate to systems, methods, and apparatuses for selection of a computing device for enabling an end-to-end network connection between a first device and a target device.

BACKGROUND

The Internet Backbone puts the customer experience at the mercy of a network provider's cost-conscious routing tables which are not catered to user performance.

It is desirable to have methods, systems, and apparatuses for selection of a server for providing an end-to-end connection between a first device and a target device which is directed to a user performance.

SUMMARY

An embodiment includes a method of selecting a computing device as a network node. The method includes collecting performance parameters associated with a plurality of computing devices, wherein the plurality of computing devices are operable to facilitate end-to-end network connections through a network, selecting the computing device to provide end-to-end network connection between a first device and a target device based on the collected performance parameters, wherein the selected computing device is included within the end-to-end network connection, and wherein the first device and the target device are endpoint edge devices, and connecting the first device to the selected computing device, thereby providing the end-to-end network connection between the first device and the target device.

An embodiment includes a network. The network includes a plurality of computing devices and a routing management system. The routing management system is operative to collect performance parameters associated with a plurality of computing devices, wherein the plurality of computing devices are operable to facilitate end-to-end network connections through a network, select the computing device to provide end-to-end network connection between a first device and a target device based on the collected performance parameters, wherein the selected computing device is included within the end-to-end network connection, and wherein the first device and the target device are endpoint edge devices, and connect the first device to the selected computing device, thereby providing the end-to-end network connection between the first device and the target device.

Other aspects and advantages of the described implementations will become apparent from the following detailed description, taken in conjunction with the accompanying drawings, illustrating by way of example the principles of the described implementations.

DETAILED DESCRIPTION

At least some embodiments include selecting a computing device for providing an end-to-end network connection between a first device and an endpoint device. For an embodiment, performance parameters of computing devices within the network are collected and used for selecting the computing device. For an embodiment, more than one computing device is selected to provide end-to-end network connections between the first device and the endpoint device, wherein a distribution of data traffic between the end-to-end network connections is weighted. For an embodiment, the computing device is selected from a selected set of available computing devices. For an embodiment, the selected computing device is adaptively updated over time. Further, for at least some embodiments, the selected set of available computing devices is adaptively updated over time, wherein computing devices are adaptively added or subtracted from the set. For an embodiment, at least one computing device of the selected set of computing devices is a virtual machine, wherein the virtual machine is software controllably added or subtracted from the set of preselected servers. For at least some embodiment, a plurality of computing devices are included within the end-to-end network connections between the first device and the endpoint device, wherein the plurality of computing devices is adaptively updated based on monitored and/or predicted performance parameters. The disclosed embodiments provide for improved end-to-end network connections between the first device and the endpoint device, and clearly improve the operation and processing of the first device and the endpoint device and the connections between the first device and the endpoint device.

Figure 1:
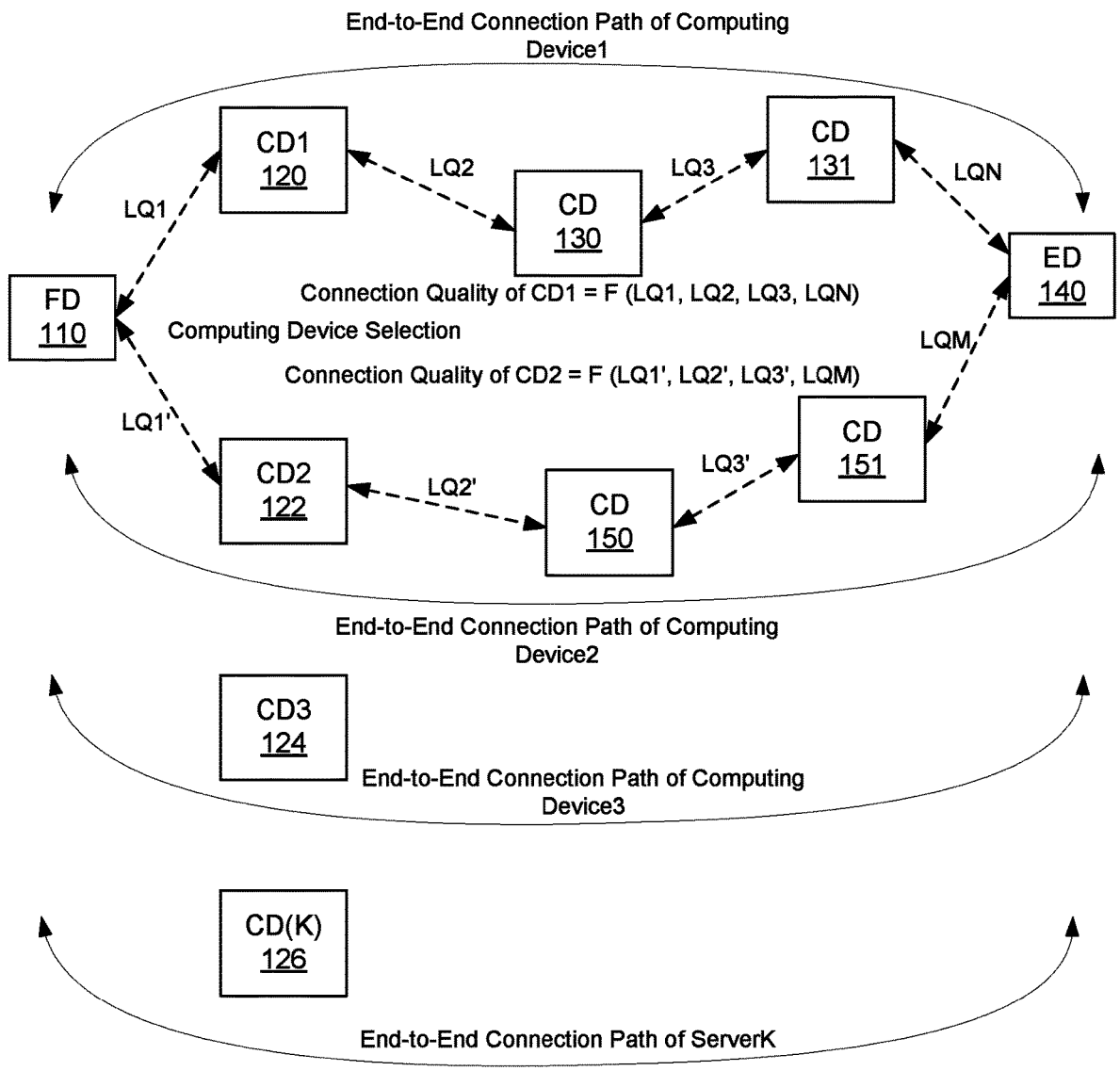
FIG. 1 shows a network that includes several possible end-to-end network connections between a first device and an endpoint device, according to an embodiment.

FIG. 1 shows a network that includes several possible end-to-end network connections between a first device (FD1) 110 and an endpoint device (ED) 140, according to an embodiment. As shown, several possible end-to-end network connections are available. However, each of the end-to-end network connections provides different levels of end-to-end network connection performance (connection quality). For an embodiment, the connection quality of each of the end-to-end network connections is determined based on link qualities of links between the devices of each of the end-to-end network connections. For example, the connection quality of the end-to-end network connection between the first device (FD1) 110 and the endpoint device (ED) 140 that passes through the computing device (CD1) 120 can be determined based on the link qualities (LQ1, LQ2, LQ3, LQN) of the links between the first computing device (CD1) 110 and the computing device (CD1) 120, between the computing device (CD1) 120 and the device 130, between the device 130 and the device 131, and between the device 131 and endpoint device 140. Further, for example, the connection quality of the end-to-end network connection between the first device (FD1) 110 and the endpoint device 140 that passes through the computing device (CD2) 122 can be determined based on the link qualities (LQ1', LQ2', LQ3', LQM') of the links between the first device (FD1) 110 and the computing device (CD2) 122, between the computing device (CD2) 122 and the device 150, between the device 150 and the device 151, and between the device 151 and endpoint device 140.

It is to be understood that one or more of the computing devices 120, 122, 124, 126 are selected as a connecting node through the network to the endpoint device 140 based on the endpoint (FD 110) to endpoint (ED 140) connection quality of the selected computing device, not based on the quality of any one of the singular links (LQ1, LQ2, LQ3, LQ4). It is possible that the computing device 120, 122, 124, 126 that provides the best endpoint to endpoint connection quality includes the worst singular link quality Further, additional end-to-end network connections can be provided by other computing devices, such as, computing device (CD3) 124, computing device (CD(K)) 126. Any number of devices can be located in each of the end-to-end network connections. As will be described, the computing device for providing access to the network can change over time, and multiple computing devices can simultaneously provide access to the network.

For an embodiment, performance parameters associated with a plurality of computing devices (such as, computing devices 120, 122, 124, 126, 130, 150, 131, 151) are collected, wherein the plurality of computing devices facilitate end-to-end network connections through the network. For an embodiment, the performance parameter of the computing device (CD1) 120 includes the end-to-end connection quality between the edge or endpoint first device (FD1) 110 and the edge or endpoint device 140. As described above, for an embodiment, the end-to-end connection quality of the computing device (CD1) 120 is determined based on the link qualities between each of the device (120, 130, 131) between the user 110 and the endpoint device (ED) 140, which can be expressed as a function of (LQ1, LQ2, LQ3, LQN).

While only two end-to-end connection paths are shown in FIG. 1, it is to be understood that a larger number of end-to-end connection paths typically exist. That is, links can be established between each of the computing devices 120, 122, 124, 126, 130, 150, 131, 151 that are not depicted, thereby resulting in substantially more than two end-to-end connection paths. Further, any number of additional computing devices may be adaptively included within the end-to-end connection paths.

Further, not only is the end-to-end connection paths being monitored and selected, at least some embodiments further include intermediate node to endpoint connection paths being monitored and continually reselected. For example, while the endpoint devices of FIG. 1 are FD 110 and ED 140, the path selections between the computing devices 120, 130, 131, and the endpoint device 140 are continuously updated based upon the monitored performance parameters associated with each of these devices. That is, for example, the connection path between the computing device CD1 120 may change over time and not include, for example, the computing device 130.

For an embodiment, performance parameters of the devices (such as, devices 120, 130, 131, 122, 150, 151) are collected over time as the devices are providing network connections between endpoint devices which typically include other endpoint devices not shown. The performance parameters are monitored and logged. The monitored and logged performance parameters are used in the selection of the computing device(s) to provide network connections between endpoint devices. Further, network knowledge along with the monitored and logged performance parameters can be used in the selection of the computing device. The individual link qualities can be measured or determined (obtained) from a source. For example, the link qualities LQ1, LQ2, LQ3, LQN can be obtained directly from the devices 120, 130, 131, 122, 150, 151. Further, network knowledge (such as computing device locations, data center provider, link type, etc.) can influence the computing device selections. Further, peering agreements can influence the computing device selections. Further, logs of performance parameters of other networks that include similar devices that include, for example, real time performance, changes over time of day, day of week, can influence the computing device selections. Further, identification of submarine cable systems associated with the connections of the computing devices can influence the computing device selections.

While generally described as link qualities, the link qualities can include one or more link quality parameters, such as, jitter, latency, throughput, MOS (Mean Opinion Score), packet loss, retransmissions, read congestion, write congestion, RTT (round trip time), and/or packet queue. The link quality parameters can be adaptively increased and adjusted over time. The performance parameters can include the links qualities, or combinations of link qualities.

As described, for at least some embodiments, the performance parameter includes one or more of throughput, latency, jitter, iperf (tool for network performance measurement), backwards traceroute and/or packet loss. For at least some embodiments, the performance parameters are continuously updated over time. For at least some embodiments, the performance parameters are obtained from any or all devices located between the connection path between the endpoint computing device (FD1) 110 and the endpoint device 140, and between other endpoint devices. The end-to-end connection performance parameters of many computing devices are accumulated and used in the selection of a computing device for providing a network connection for the first device 110. Further, similar network parameters between the first device 110 and the other endpoint devices (such as, subnet or location) can be used in the computing device selection. That is, performance parameters collected for an end-to-end network connections of an endpoint device that is similar to the first device 110 can be utilized in the computing device selection of the first device 110. Further, network knowledge can influence the prediction of computing device performance that influences the computing device selection.

As described, for an embodiment, the selected computing device is included within the end-to-end network connection, and the first device and the target device are endpoint edge devices. The endpoint edge devices are distinguishable from the other devices of the end-to-end network connection in that the endpoint edge device either consume or generate information, whereas the other devices within the end-to-end network connection pass the information along through the end-to-end network connection. For an embodiment, the endpoint edge devices either generate or consume data, but do not pass data through to another device. For an embodiment, at least one of the endpoint edge devices includes a connection initiator.

For an embodiment, selecting the computing device occurs only after detecting an anomaly in a present connection of the first device. For an embodiment, detecting the anomaly includes sensing a performance parameter of the end-to-end network connection between the first device and the target device falling below a predetermined threshold. The detected anomalies can include user anomalies (such as an anomaly with the first device) or computing device anomalies. A user anomaly can include a specific IP/subnet providing performance that is less than other peers using the same computing device which can be caused by a number of reasons. Some reasons include either great distance between the users (endpoint devices) and the computing device, or bad peering between the end users (endpoint devices) and the computing device, or number of hops, or quality of the hops etc. For an embodiment, when this type of anomaly occurs, the system (for example, a management system) will try (attempt) to find a better computing device to serve the user/subnet of the endpoint device. A computing device anomaly can include performance measurements of the computing device not being as good as they used to be, or not as good as other computing devices. This indicates that there might be a problem with the computing device. If a vast degradation in performance occurs, and an anomaly in the performance is detected of the computing device, the weight of the traffic flowing through the computing device may decrease.

Once the selected computing device to provide end-to-end network connection between the first device 110 and the endpoint device 140 based on the collected performance parameters has been selected, the first device 110 is connected to the selected computing device, thereby providing the end-to-end network connection between the first device and the target device. Various methodologies can be utilized to connect the first device 110 to the selected computing device, such as, DNS (Domain Name System), GRE (Generic Routing Encapsulation), any tunneling protocol, or IP (internet protocol) override.

The computing device selections as described, provide improved device (such as, the first device) operation as better end-to-end network connections are provided.

Figure 2:
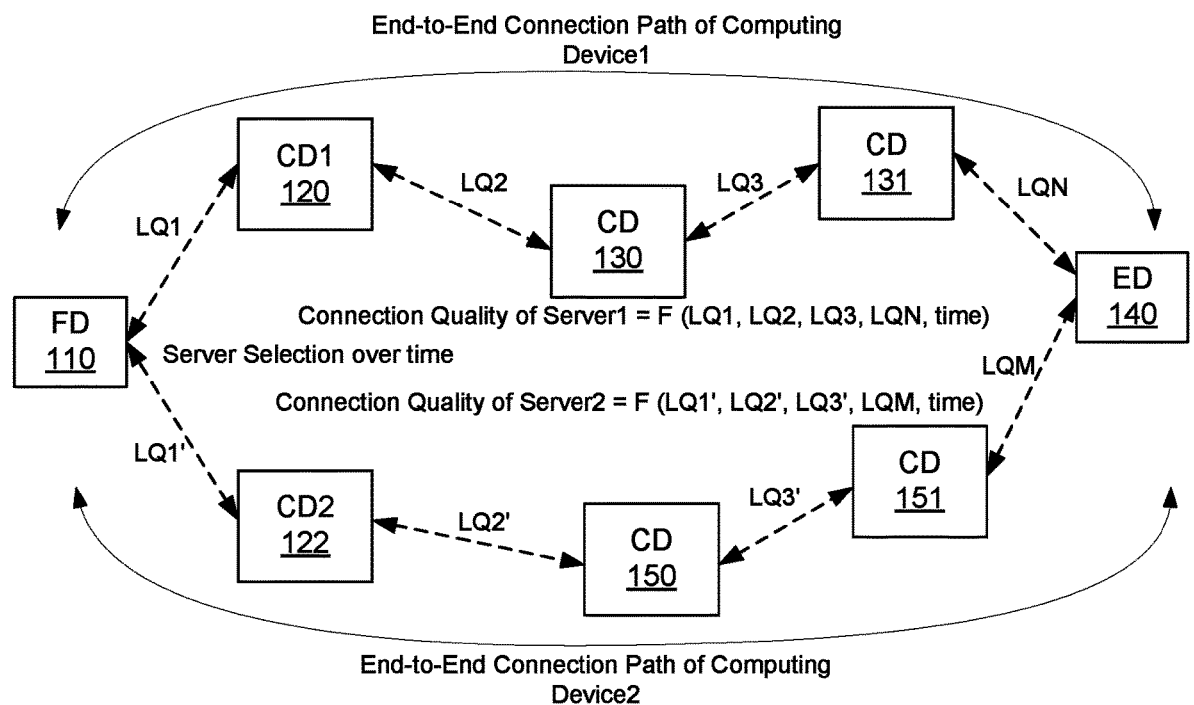
FIG. 2 shows a network that includes several possible end-to-end network connections between a first device and an endpoint device, wherein an end-to-end connection quality changes over time, according to an embodiment.

FIG. 2 shows a network that includes several possible end-to-end network connections between a first device 110 and an endpoint device 140, wherein an end-to-end connection quality changes over time, according to an embodiment. Typically, the connection quality of the end-to-end network connections changes over time. For an embodiment, the computing device 120, 122 that is selected, and to which the user is connected to varies over time. According, the end-to-end connection quality of each of the computing devices 120, 122 is a function of (LQ1, LQ2, LQ3, LQN, time) for the computing device 120 and a function of (LQ1', LQ2', LQ3', LQN', time) for the computing device 122. Many factors can lead to the end-to-end network connections, such as, traffic load variations, and/or the addition or subtraction of available computing device for providing the end-to-end connection.

Figure 3:
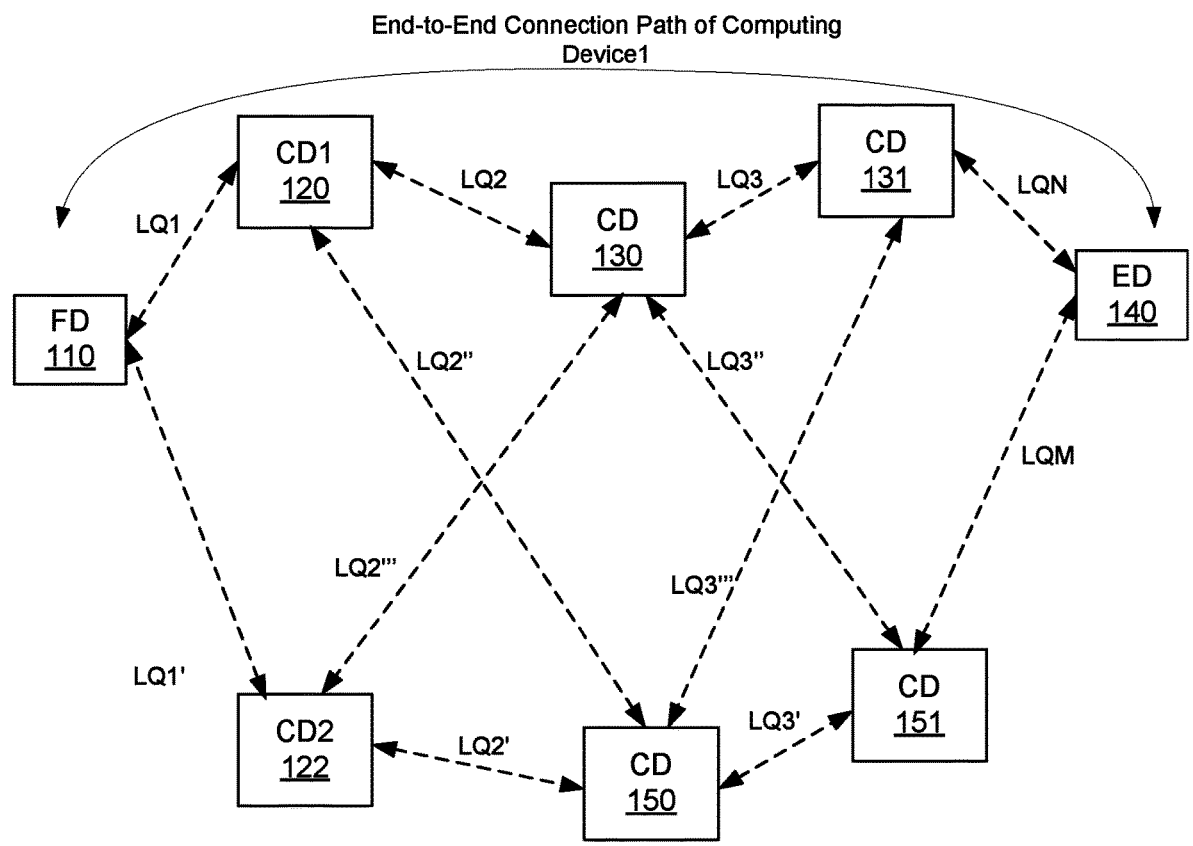
FIG. 3 shows a network that includes several possible end-to-end network connections between a first device and an endpoint device, according to another embodiment.

FIG. 3 shows a network that includes several possible end-to-end network connections between a first device and an endpoint device, according to another embodiment. FIG. 3 further depicts link qualities LQ2", LQ2''', LQ3", LQ3''' between the computing devices 120, 122, 130, 150, 131, 151, and shows the large number of possible end-to-end connection paths possible between the first device (FD) 110 and the endpoint device (ED) 140.

For at least some embodiments, path selections between each of the computing devices 120, 122, 130, 150, 131, 151 and the endpoint device (ED) are additionally selected based on monitored performance parameters of the computing devices 120, 122, 130, 150, 131, 151. Accordingly, the path selection between the endpoint devices is adaptively updated as the path selections between the computing devices are continually monitored and updated.

For at least some embodiments, each step of a hop along a path of computing devices through the network is continually monitored and updated based on the performance parameters of the links and computing devices along the path. Each computing device along the path can change based on the monitored performance parameters. For example, the path from the first device (FD) 110 may follow the path defined by the computing devices CD1 120, CD 130, CD131, and then be adaptively updated to follow the path defined by the computing devices CD1 120, CD 150, CD131 based on the monitored performance parameters.

Figure 4:
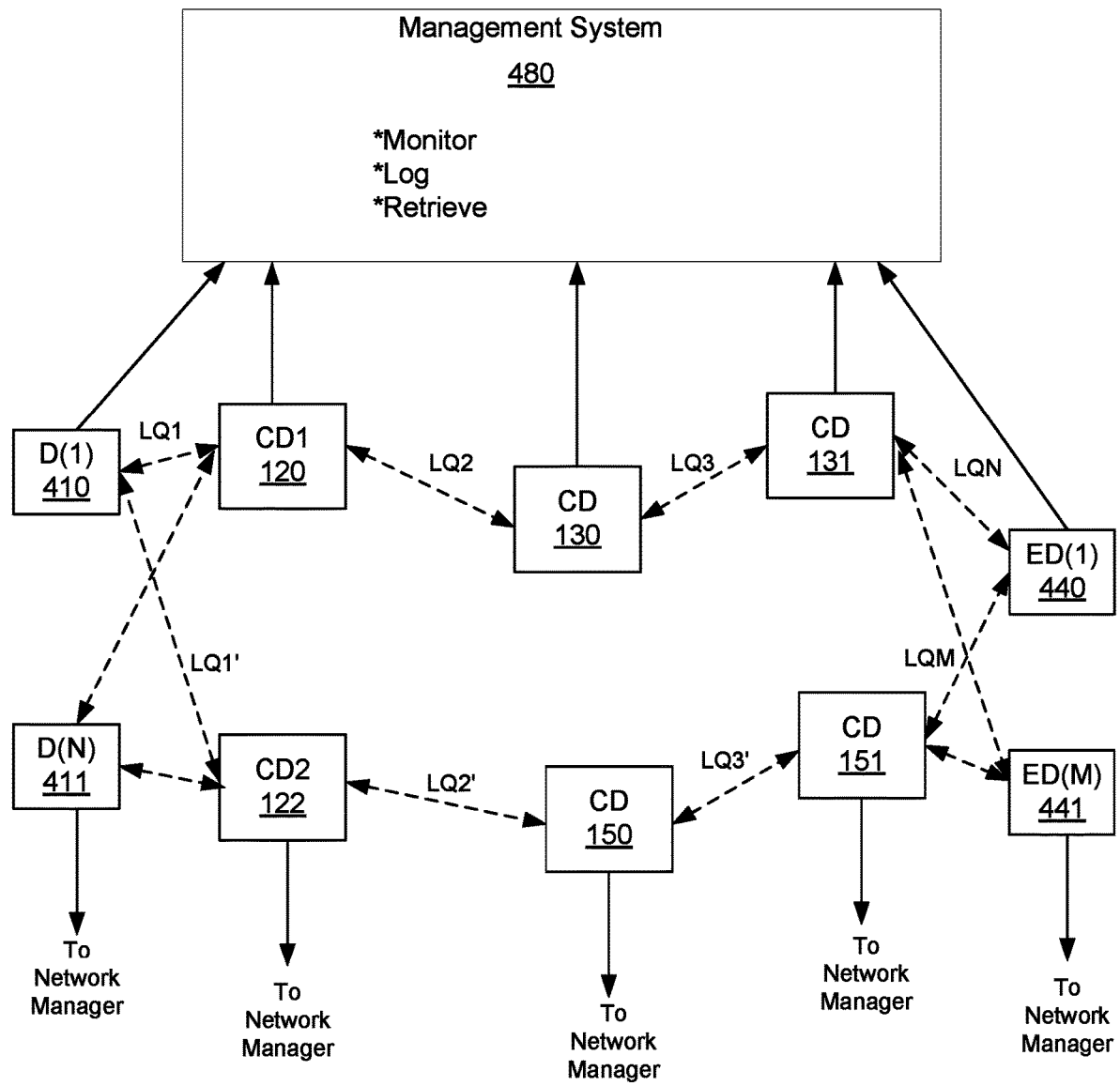
FIG. 4 shows a network that includes a management system that collects information of devices of several possible end-to-end network connections between endpoint devices, according to an embodiment.

FIG. 4 shows a network that includes a management system 480 that collects information (performance parameters) of devices of several possible end-to-end network connections between endpoint devices D(1) 410, D(N) 411, ED(1) 440, ED(M) 441, according to an embodiment. For an embodiment, collecting performance parameters includes monitoring data traffic through each of the plurality of computing devices 120, 130, 131, 122, 150, 151, logging the monitored data traffic, and retrieving the logged monitored data traffic when determining a level of end-to-end performance of a connection path that includes the computing device. For various embodiments, the management system 480 is either internal or external to the network and/or the computing devices.

The monitored data traffic is between an number of possible endpoint devices D(1) 410, D(N) 411, ED(1) 440, ED(M) 441. For an embodiment, the management system 480 monitors the traffic and logs the monitored traffic for future reference. When selecting at least one of the computing device (such as, computing devices 120, 122) as a connecting node, the monitored data traffic is retrieved to aid in the selection of the at least one of the computing device. That is, data traffic can be monitored for other endpoint device to aid the selection of computing device as a connecting node for the first device.

For an embodiment, properties and/or locations of the endpoint device are monitored along with the performance parameters. When selecting the computing device as a connecting node for the first device, the properties and/or locations of the endpoint device in which traffic has been monitored can be used for estimating a projected performance of an end-to-end connection of the first device.

Exemplary properties include ISP, Network type (WiFi, cellular, etc.), IP subnet, IP type, and/or Geo location of the endpoint device.

For an embodiment, monitoring the data traffic includes passively monitoring in-band data traffic. That is, over time, network connections within the network will naturally have data traffic flow through them. The performance of the network connections can be passively monitored as this data traffic flows.

For an embodiment, monitoring the data traffic includes proactively pushing out-of-band data traffic and monitoring the out-of-band data traffic. That is, data traffic can be proactively and selectively routed through the network connections, and the performance parameters can be collected while the out-of-band data traffic is flowing through network connections. At least some embodiments include ping (for latency), running traceroute (number of hops), and/or iperf (for throughput).

For an embodiment, correlations of different types of performance parameters can be used to aid the collection of the performance parameters. That is, for example, a low-cost, easy to collect performance parameter may be used to project or estimate and high-cost, hard to collect performance parameter when the low-cost, easy to collect performance parameter is determined to be correlated to the high-cost, hard to collect performance parameter. More generally, for an embodiment, monitoring the data traffic includes monitoring a first parameter of the data traffic, and predicting a second parameter of the data traffic is predicted based on the first data parameter. For example, latency of the data traffic may be monitored because it is cheap and easy to monitor rather than throughput because throughput is harder and more expensive to monitor. This is useful when the performance of the first parameter is correlated performance of the second parameter. Correlation can be determined by creating an ML algorithm to model the correlation.

As described, for an embodiment, the management system collects the performance parameters based on network connections of devices of the network. As previously described, the collecting includes monitoring data traffic propagating through the end-to-end network connections of other devices, logging the monitored data traffic, and retrieving the logged monitored data traffic when determining a level of end-to-end performance of a connection path that includes the computing device.

Figure 5:
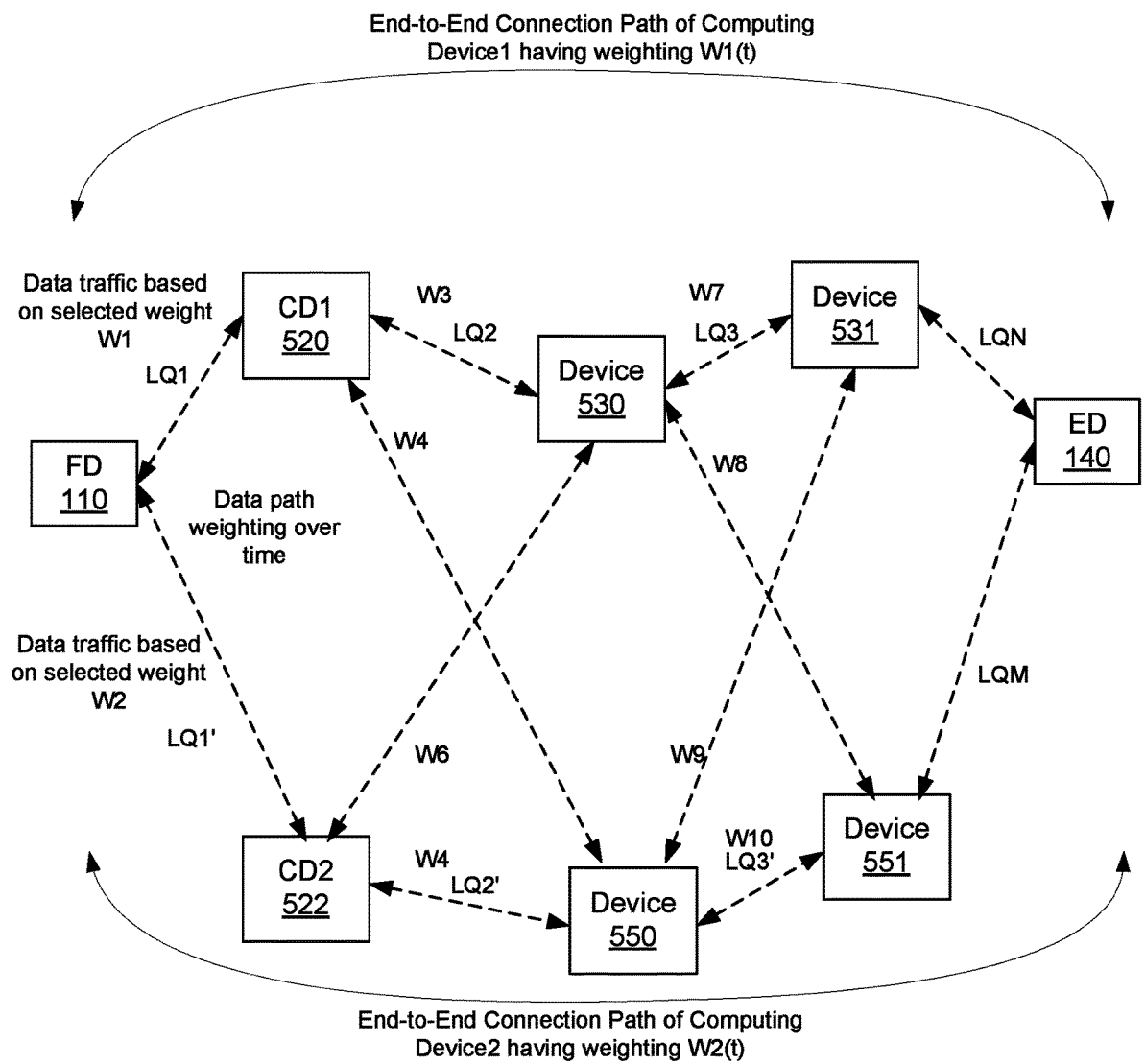
FIG. 5 shows a network that includes several possible end-to-end network connections between a first device and an endpoint device, wherein more than one computing device is selected to provide end-to-end network connections between the first device and the endpoint device, according to an embodiment.

FIG. 5 shows a network that includes several possible end-to-end network connections between a first device and an endpoint device, wherein more than one computing device 520, 522 is selected to provide end-to-end network connections between the first device (FD 110) and the endpoint device (ED 140), according to an embodiment. That is, an embodiment further includes selecting a second computing device 522 to provide end-to-end network connection between the first device 110 and the target device 140 based on the collected performance parameters, wherein the selected second computing device 522 is included within the end-to-end network connection. For an embodiment, the first computing device 520 and the second computing device 522 simultaneously provide end-to-end network connections between the first device (FD 110) and the endpoint device (ED 140). For an embodiment, the criteria used for selecting the first computing device 520 can also be used for selecting the second computing device 522. That is, the second computing device 522 can be selected based on the collected performance parameters, and/or knowledge of the network, and or the properties of the second computing device 522.

For at least some embodiments, the selection of a computing device is based on a machine learning algorithm that predicts the end to end performance that the network can provide the endpoint devices based on collected performance parameters of the computing device, and/or knowledge of the network (including historical information of other networks), and or the properties of the computing device and/or other $3^{rd}$ party data sources.

At least some embodiments include splitting data traffic communicated between first device 110 and the target device 140 between the selected computing device 520 and the selected second computing device 522. That is, the data traffic is split between the two end-to-end network connections as selected. While only two selected computing devices are shown, it is to be understood that any number of computing devices can be selected to provide simultaneous network connections to the first device 110.

At least some embodiments further include determining a set of weights based on collected or predicted performance parameters, and splitting the data traffic between the selected computing device and the selected second computing device based on the determined set of weights. That is, the two end-to-end connection paths can distribute the data traffic evenly (50% each) or any other possible percentage.

As shown in FIG. 5, a first set of weights W1, W2 are selected to distribute the data traffic between the first device (FD) 110 and selected computing devices CD1 520 and CD2 522. Further, a second set of weights W3, W4 can be selected to distribute the data traffic of the computing device CD1 520 that propagates through to the computing devices 530, 550. Further, a third set of weights W5, W6 can be selected to distribute the data traffic of the computing device CD2 522 that propagates through to the computing devices 530, 550. Further, a fourth set of weights W7, W8 can be selected to distribute the data traffic of the computing device CD 530 that propagates through to the computing devices 531, 551. Further, a fifth set of weights W9, W10 can be selected to distribute the data traffic of the computing device CD 550 that propagates through to the computing devices 531, 551. That is, the weights can be set between every set of devices, and the traffic propagates through the multiple paths from the first device (FD) 110 and the endpoint device (ED) 140.

For at least some embodiments, the weights W1, W2, W3, W4, W5, W6, W7, W8. W9, W10 are first determined according to the measurements taken and performance predictions based on the monitored performance parameters. The measurements and performance predictions can be generated, for example, by the management system 580.

For at least some embodiment, the weights W1, W2, W3, W4, W5, W6, W7, W8. W9, W10 are later or further calibrated according to the achieved performance (as monitored by the management system) that was logged for the data traffic flowing through the network. For at least some embodiments, the weights are updated periodically. For at least some embodiments, the weights are adaptively updated upon detection of an anomaly.

Figure 6:
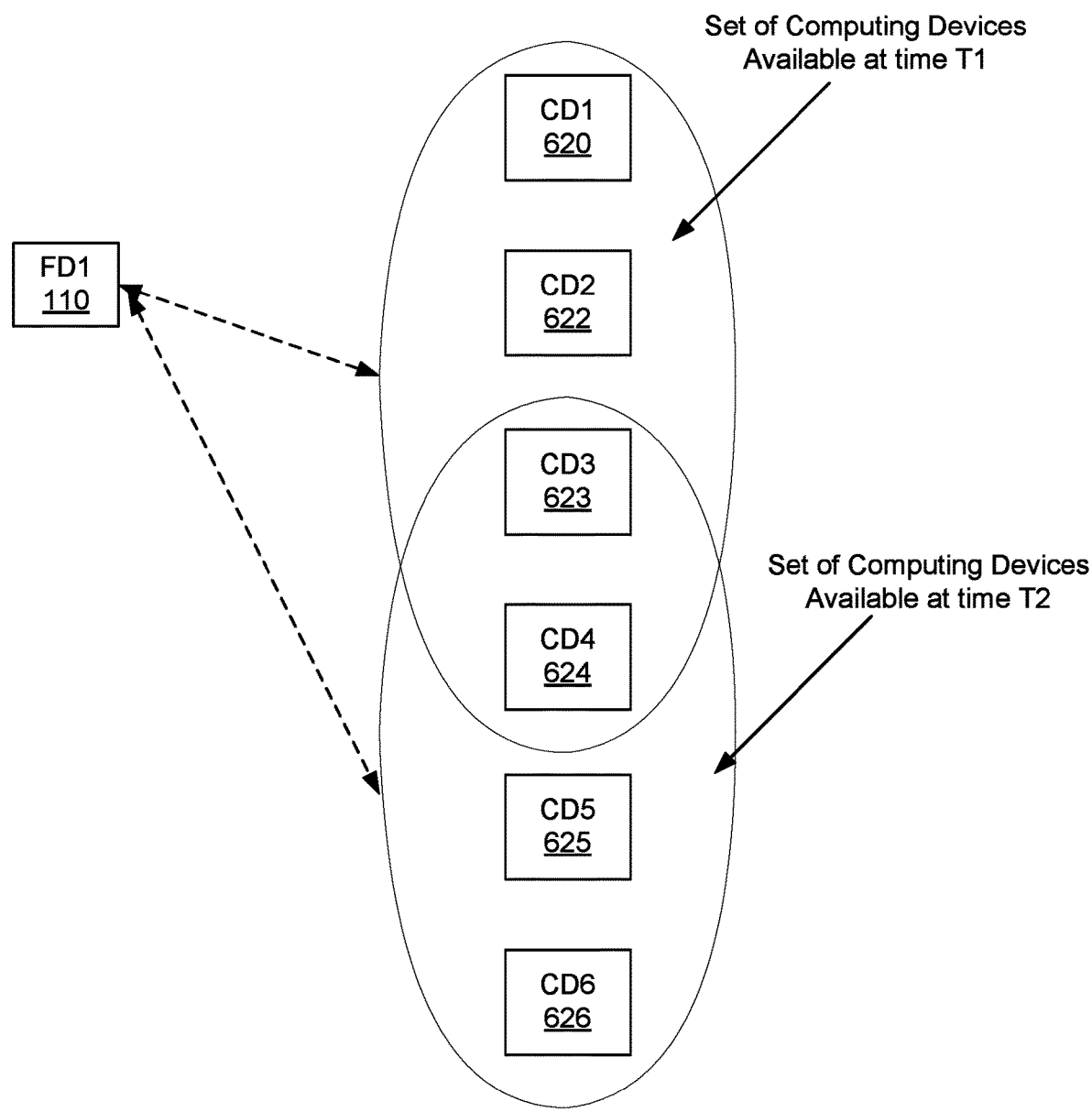
FIG. 6 shows a network that includes several possible end-to-end network connections between a first device and an endpoint device, wherein a set of available computing devices for selection changes over time, according to an embodiment.

FIG. 6 shows a network that includes several possible end-to-end network connections between a first device and an endpoint device, wherein a set of available computing devices for selection changes over time, according to an embodiment. As shown, at a time T1, the set of available computing devices includes computing devices 520, 522 523, 524 and at the time T2, the set of the available computing devices includes computing devices 523, 524, 525, 526.

For at least some embodiments, the set of available computing devices are selected based on the properties of the plurality of computing devices and based on past monitoring of performance parameters of the plurality of computing devices. Further, the properties can be used for selecting the set of available computing devices. Further, the location of available computing devices can be used for selecting the set of available computing devices. Exemplary performance parameter includes ISP, IP subnet, IP type, Geo location, Cloud provider, data center and others.

For at least some embodiments, selecting the set of available computing devices includes identifying an initial set of potential computing devices based on monitored performance parameters, and other data (for example, 3rd party data, etc.). For at least some embodiments, the initial set of potential computing devices is selected based on a distance between the computing devices and the endpoint devices and/or based on past performance data from other networks. Further, present performance parameters associated with the first device and each of the computing devices of the initial set of potential computing devices are measured or predicted. For an embodiment, the set of computing devices is selected based on the measured present performance, and performance in the same network in the past (for example, if a computing device did not provide good performance (performance greater than a threshold in the last X minutes, a different device from the potential set is chosen)).

For an embodiment, the management system creates a separate network for each accelerated application. That means, each application is accelerated by a separate set of computing devices, and the selection of computing devices is done per application/network. For each network, a separate set of logs are created to allow for prediction of a performance of a computing device for the same network, based on measurements that were taken in the past for the exact application that is being accelerated.

For at least some embodiments, the set of available computing devices changes as servers (computing devices) and/or data centers of the servers fail. That is, a computing device may be operational and included within the set of available computing devices. However, at a later time, the computing device may fail, and then be removed from the set of available computing devices.

For at least some embodiments, the set of available computing devices changes as traffic through the network, servers or data centers is sensed to have changed. For example, if data traffic is sensed to have increased or is greater than a predetermined threshold, the number of computing devices included within the set of computing devices available for selection can be increased.

For at least some embodiments, the set of available computing devices changes upon sensing failure or the need for more capacity. A new computing device may be added or selected to be added based upon previous knowledge of computing device capabilities. For example, computing devices of a particular data center may have been found to have a useful impact in the past. Therefore, these computing devices may be intelligently added based on this previous knowledge. At least some embodiments include testing and tracking the behavior and possible end point-to-end point connection provided by servers that could possibly be added set of available computing devices.

For at least some embodiments, computing device performance and behavior are measured, monitored, logged and tracked to enable computing device selection. For an embodiment, computing device behavior is tracked at times in all networks via logs of a management system. For an embodiment, the logged data is then aggregated by specific data centers, and can further be aggregated by application type (SaaS, content collaboration, etc.) or by a metric that is optimized in the network. For at least some embodiments, the aggregated data of the management system is provided to a learning set. For at least some embodiments, the learning set predicts which computing device the network should use next (according to the application type, order in the end-to end connectivity path, metric for optimization and traffic pattern (number of users and their properties)). For at least some embodiments, the next computing device is the next computing device along an end-to-end connection path between the endpoint devices.

Figure 7:
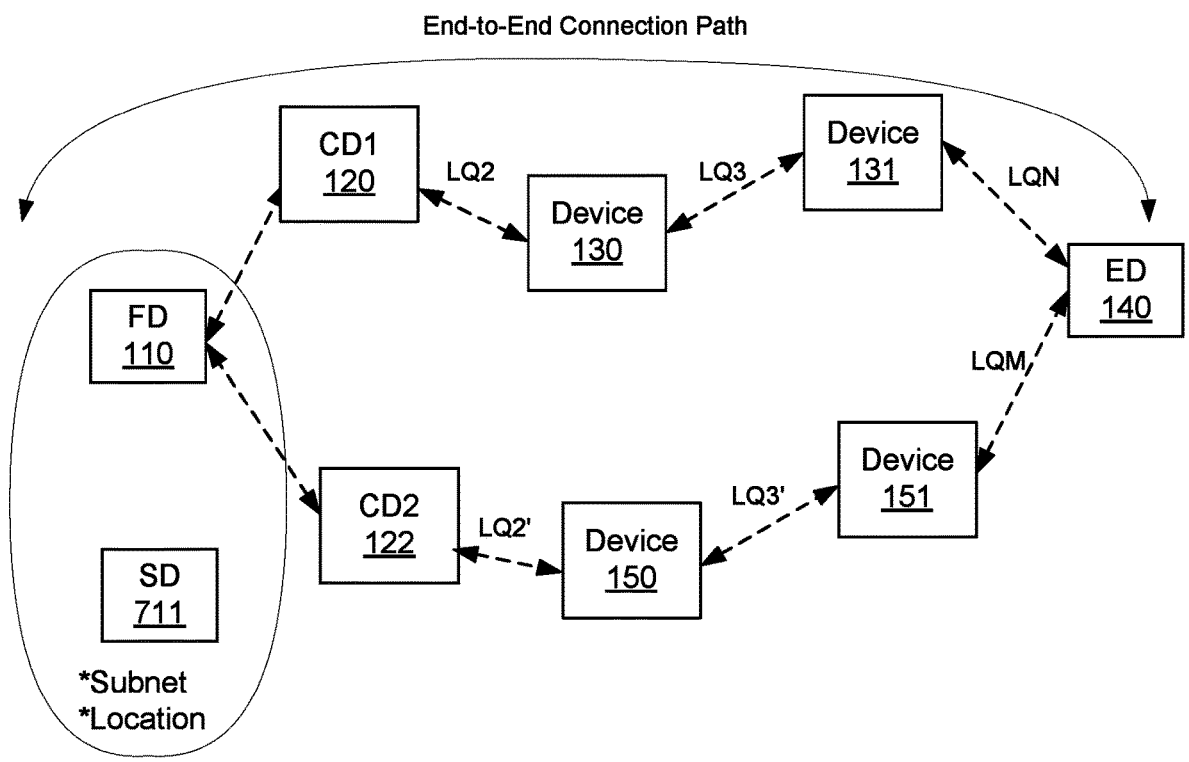
FIG. 7 shows a network that includes a management system that collects information of devices of several possible end-to-end network connections between endpoint devices, and selects computing devices for more than one endpoint device, according to an embodiment.

FIG. 7 shows a network that includes a management system that collects information of devices of several possible end-to-end network connections between endpoint devices, and selects computing devices for more than one endpoint device, according to an embodiment. For an embodiment, the performance parameters collected by the management system 380 for end-to-end network connections between the first device 110 and the endpoint devices 140 can be used to influence the selection of a computing device to provide network access for a second device (SD) 711. For example, the performance parameters of the end-to-end network connections between the first device 110 and other endpoint device 140, can be weighted greater and assumed to more accurately represent performance parameters of the end-to-end network connections between the second device 711 and other endpoint device 140 because the first device 110 and the second device (SD) 711 have commonality, such as, location, subnet, or network connections.

Figure 8:
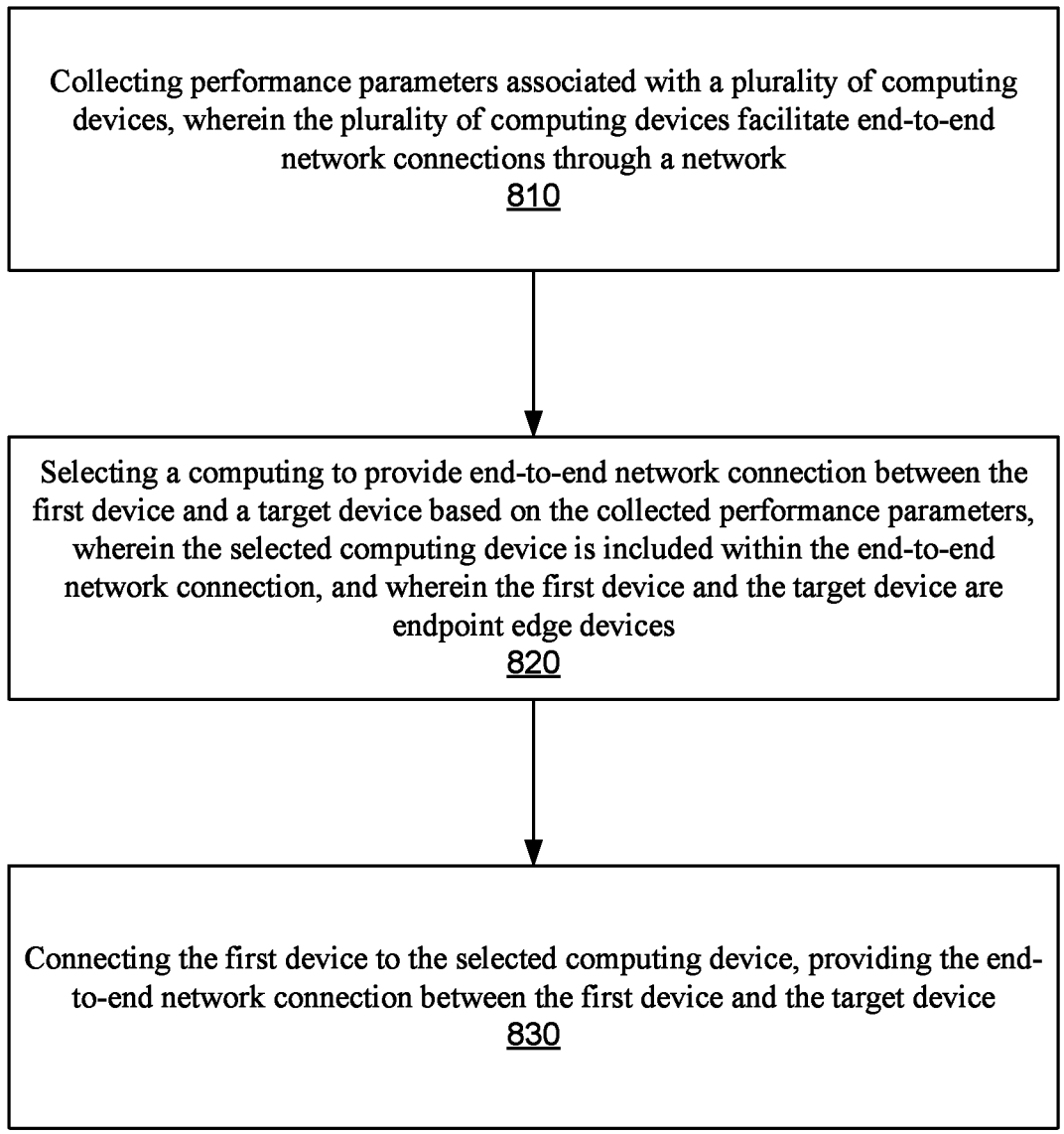
FIG. 8 is a flow chart of steps of a method of selecting a computing device as a network node, according to an embodiment.

FIG. 8 is a flow chart of steps of a method of selecting a computing device as a network node, according to an embodiment. A first step 810 includes collecting performance parameters associated with a plurality of computing devices, wherein the plurality of computing devices are operable to facilitate end-to-end network connections through a network. A second step 820 includes selecting the computing device to provide end-to-end network connection between a first device and a target device based on the collected performance parameters, wherein the selected computing device is included within the end-to-end network connection, and wherein the first device and the target device are endpoint edge devices. A third step 830 includes connecting the first device to the selected computing device, thereby providing the end-to-end network connection between the first device and the target device.

As previously described, for an embodiment, the endpoint edge devices either generate or consume data, but do not pass data through to another device. As previously described, for an embodiment, at least one of the endpoint edge devices comprises a connection initiator.

As previously described, for an embodiment, the computing device is selected from amongst available computing devices of the plurality of computing devices based on a level of end-to-end performance of a connection path that includes the computing device, wherein the end-to-end performance indicates a level of performance of the connection between the first device and the target device. For an embodiment, the end-to-end performance of a connection path is based on a function of performances of links between the computing devices included within the connection path that includes the computing device. For an embodiment, the selected server (computing device) is within the connection path that provides the best end-to-end performance. That is, the level of performance of the connection between the first device and the target device is estimated based on collected performance parameters of the computing devices while the computing devices are providing end-to-end connections of other endpoint devices. For an embodiment, the accuracy of the estimation is based on the amount of available data. For example, the more users (other endpoint devices) using or connecting to a computing device (such as, the first computing device) having similar properties as the first device, the better the end-to-end connection performance can be predicted.

As previously described, for an embodiment, the performance parameters are collected continuously over time and the computing device is adaptively selected from a set of available computing devices over time, in response to the continuously collected performance parameters and/or 3rd party data.

For an embodiment, selecting the computing device occurs periodically. Further, as previously described, for an embodiment, selecting the computing device occurs only after detecting an anomaly in a present connection of the first device. For an embodiment, detecting the anomaly includes sensing a performance parameter of the end-to-end network connection between the first device and the target device falling below a predetermined threshold. For at least some embodiments, the predetermined threshold is adaptively adjusted based on a selected level of performance. The detected anomalies can include user anomalies or computing device anomalies. A user anomaly can include a specific IP/subnet providing performance that is less than other peers using the same computing device. This can be caused due to a number of reasons. Some reasons include either great distance between the users (endpoint devices) and the computing device, or bad peering between the end users' (endpoint devices) ISP (internet service provider) and the computing device. When this type of anomaly occurs, the system (for example, a management system) will try to find a better computing device to serve the user/subnet of the endpoint device. A computing device anomaly can include performance measurements of the computing device not being as good as they used to be, or not as good as other computing devices. This indicates that there might be a problem with the computing device. If a vast degradation in performance occurs, and an anomaly in the performance is detected of the computing device, the weight of the traffic flowing through the computing may decreased.

As previously described, for an embodiment, collecting performance parameters includes monitoring data traffic through each of the plurality of computing devices, logging the monitored data traffic, and retrieving the logged monitored data traffic when determining a level of end-to-end performance of a connection path that includes the computing device. For an embodiment, the monitored data traffic is the end to end data traffic between other endpoint devices, wherein the other endpoint device have a commonality with the first device, such as, a common subnet or proximate to a common location. For an embodiment, the monitored data traffic is the data traffic between other endpoint devices and computing devices in the network, wherein the other endpoint device have a commonality with the first device. As previously described, for an embodiment, monitoring the data traffic includes passively monitoring in-band data traffic. As previously described, for an embodiment, monitoring the data traffic includes proactively pushing out-of-band data traffic and monitoring the out-of-band data traffic. As previously described, for an embodiment, monitoring the data traffic include monitoring a first parameter of the data traffic, and wherein a second parameter of the data traffic is predicted based on the first data parameter. For example, latency of the data traffic may be monitored because it is cheap and easy to monitor rather than throughput because throughput is harder and more expensive to monitor. This is useful when the performance of the first parameter is correlated performance of the second parameter. As previously described, for an embodiment, logging and monitoring occurs at a management system.

For an embodiment, computing device behavior is tracked at times in all networks via logs. For an embodiment, the logged data is then aggregated by specific data centers, and other properties, and can further be aggregated by application type (SaaS, content collaboration, etc.) and/or by metric that is optimized in the network. For at least some embodiments, the aggregated data of the management system is provided to a learning set. For at least some embodiments, the learning set predicts which computing device the network should use next (according to the application type, order in the end-to end connectivity path, metric for optimization and traffic pattern (number of users and their properties)). For at least some embodiments, the next computing device is the next computing device along an end-to-end connection path between the endpoint devices.

As previously described, for an embodiment, the management system collects the performance parameters based on end-to-end network connections of other devices comprising monitoring data traffic propagating through the end-to-end network connections of other devices, logging the monitored data traffic, and retrieving the logged monitored data traffic when determining a level of end-to-end performance of a connection path that includes the computing device.

As previously described, at least some embodiments further include selecting a second computing device to provide end-to-end network connection between the first device and the target device based on the collected performance parameters, wherein the selected second computing device is included within the end-to-end network connection. It is to be understood, however, that there can be more than two computing devices. For an embodiment, the second computing device is selected using a subset of all of the performance parameters used for selecting the first computing device. As previously described, at least some embodiments include splitting data traffic communicated between first device and the target device between the selected computing device and the selected second computing device. As previously described, at least some embodiments include determining a set of weights based on the collected performance parameters, and splitting the data traffic between the selected computing device and the selected second computing device based on the determined set of weights.

For at least some embodiments, the set of weights are first determined according to the measurements taken and performance predictions based on the monitored performance parameters, $3^{rd}$ party data, etc. The measurements and performance predictions can be generated, for example, by the management system.

For at least some embodiment, the weights are later or further calibrated according to the achieved performance (as monitored by the management system) that was logged for the data traffic flowing through the network. For at least some embodiments, the weights are updated periodically. For at least some embodiments, the weights are adaptively updated upon detection of an anomaly.

As previously described, for an embodiment, the computing device is selected from a set of computing devices, and the set of computing devices is adaptively adjusted over time. For example, the set of available computing devices can change as computing devices and/or data centers of the computing devices fail. Further, the set of available computing devices can change as failed computing devices or data centers recover from failure. For an embodiment, when the data traffic propagating through the network, computing devices or data centers is sensed to have changed (for example, increase) the available set of computing devices can be increased. Further, upon sensing failure or the need for more capacity, new computing devices to be added can be selected based upon previous knowledge of computing device capabilities. For example, computing devices of a particular data center may have been found to have a useful impact in the past. Therefore, these computing devices may be intelligently added based on this previous knowledge.

As previously described, for an embodiment, the set of available computing devices are selected based on the properties of the plurality of computing devices and based on past monitoring of performance parameters of the plurality of computing devices.

As previously described, for an embodiment, selecting the set of available computing devices includes identifying an initial set of potential computing devices based on monitored performance parameters, measuring or predicting present performance parameters associated with the first device and each of the computing devices of the initial set of potential computing devices, wherein the set of computing devices is selected based on the measure present performance parameters associated with the first device and each of the computing devices of the identified initial set of potential computing devices.

As previously described, at least some embodiments further include selecting the computing device to provide end-to-end network connection between a second device and a second target device (that is, additional endpoint devices other than the first device and the endpoint device) and the based on the collected performance parameters, a subnet of the second device, a location of the second device, and knowledge of the network, wherein the selected other computing device is included within the end-to-end network connection, and wherein the second device and the second target device are endpoint edge devices. Further, the second device is connected to the selected other computing device, thereby providing the end-to-end network connection between the second device and the second target device. It is to be understood that there may be any number of possible endpoint devices, and any combination of end-to-end network connections between the endpoint devices.

For at least some embodiments, the set of available servers includes a virtual machine. For at least some embodiments, the use of virtual machines as a connecting server can provide the benefit of being very agile and adaptive. That is, changes (addition or subtraction of computing devices) can happen quickly and easily. For an embodiment, the virtual machine includes software that that mimics the action of a computing device or other hardware device, in using the computer's resources and resides as a protected memory space, usually on a hard disk.

Although specific embodiments have been described and illustrated, the embodiments are not to be limited to the specific forms or arrangements of parts so described and illustrated.

What is claimed:

1. A method of selecting a computing device as a network node, comprising:

collecting performance parameters associated with a plurality of computing devices, wherein the plurality of computing devices are operable to facilitate end-to-end network connections through a network;

selecting the computing device to provide end-to-end network connection between a first device and a target device based on the collected performance parameters, wherein the selected computing device is included within the end-to-end network connection, and wherein the first device and the target device are endpoint edge devices; and connecting the first device to the selected computing device, thereby providing the end-to-end network connection between the first device and the target device;

wherein the computing device is selected from amongst available computing devices of the plurality of computing devices based on a level of end-to-end performance of a connection path that includes the computing device, wherein the end-to-end performance indicates a level of performance of the connection between the first device and the target device.

2. The method of claim 1, wherein the endpoint edge devices either generate or consume data, but do not pass data through to another device.

3. The method of claim 1, wherein at least one of the endpoint edge devices comprise a connection initiator.

4. The method of claim 1, wherein the performance parameters are collected continuously over time and the computing device is adaptively selected from a set of available computing devices over time, in response to the continuously collected performance parameters.

5. The method of claim 1, wherein selecting the computing device occurs only after detecting an anomaly in a present connection of the first device.

6. The method of claim 5, wherein detecting the anomaly comprises sensing a performance parameter of the end-to-end network connection between the first device and the target device falling below a predetermined threshold.

7. The method of claim 1, wherein collecting performance parameters comprises:

monitoring data traffic through each of the plurality of computing devices;

logging the monitored data traffic; and retrieving the logged monitored data traffic when determining a level of end-to-end performance of a connection path that includes the computing device.

8. The method of claim 7, wherein a management system collects the performance parameters based on end-to-end network connections of other devices comprising monitoring data traffic propagating through the end-to-end network connections of other devices, logging the monitored data traffic, and retrieving the logged monitored data traffic when determining a level of end-to-end performance of a connection path that includes the computing device.

9. The method of claim 1, further comprising selecting a second computing device to provide end-to-end network connection between the first device and the target device based on the collected performance parameters, wherein the selected second computing device is included within the end-to-end network connection.

10. The method of claim 9, further comprising splitting data traffic communicated between first device and the target device between the selected computing device and the selected second computing device.

11. The method of claim 10, further comprising determining a set of weights based on the collected performance parameters, and splitting the data traffic between the selected computing device and the selected second computing device based on the determined set of weights.

12. The method of claim 11, wherein further comprising determining a set of weights for each computing device along each hop within the end-to-end network connection.

13. The method of claim 1, wherein the computing device is selected from a set of the available computing devices, and the set of the available computing devices is adaptively adjusted over time.

14. The method of claim 13, wherein the set of available computing devices are selected based the properties of the plurality of computing devices and based on past monitoring of performance parameters of the plurality of computing devices.

15. The method of claim 13, wherein selecting the set of available computing devices comprises:
identifying an initial set of potential computing device based on monitored performance parameters;
measuring present performance parameters associated with the first device and each of the computing devices of the initial set of potential computing devices;
wherein the set of computing devices is selected based on the measure present performance parameters associated with the first device and each of the computing devices of the identified initial set of potential computing devices.

16. The method of claim 1, further comprising:
selecting another computing device to provide end-to-end network connection between a second device and a second target device based on the collected performance parameters, properties of the second device, a location of the second device, and knowledge of the network, wherein the selected other computing device is included within the end-to-end network connection, and wherein the second device and the second target device are endpoint edge devices; and
connecting the second device to the selected other computing device, thereby providing the end-to-end network connection between the second device and the second target device.

17. The method of claim 1, wherein:
collecting performance parameters associated with a plurality of computing devices comprises measuring the performance parameter at each of the computing devices,
selecting the computing device to provide end-to-end network connection between a first device and a target device comprises predicting, by a management system the end-to-end network connection between a first device and a target device based on the collecting performance parameters.

18. A network, comprising:
a plurality of computing devices;
a routing management system, the routing management system operative to:
collect performance parameters associated with a plurality of computing devices, wherein the plurality of computing devices are operable to facilitate end-to-end network connections through a network;
select the computing device to provide end-to-end network connection between a first device and a target device based on the collected performance parameters, wherein the selected computing device is included within the end-to-end network connection, and wherein the first device and the target device are endpoint edge devices, wherein the computing device is selected from amongst available computing devices of the plurality of computing devices based on a level of end-to-end performance of a connection path that includes the computing device, wherein the end-to-end performance indicates a level of performance of the connection between the first device and the target device; and
connect the first device to the selected computing device, thereby providing the end-to-end network connection between the first device and the target device.

* * * * *